United States Patent [19]

Iwamoto

[11] Patent Number: 4,743,071
[45] Date of Patent: May 10, 1988

[54] HYDRAULIC BRAKE SYSTEM FOR VEHICLE

[75] Inventor: Tadashi Iwamoto, Saitama, Japan

[73] Assignees: Akebono Brake Industry Co., Ltd., Tokyo; Akebono Research and Development Centre Ltd., Saitama, both of Japan

[21] Appl. No.: 831,343

[22] Filed: Feb. 20, 1986

[30] Foreign Application Priority Data

Feb. 26, 1985 [JP] Japan .................. 60-37290

[51] Int. Cl.[4] .............................. B60T 13/74
[52] U.S. Cl. ......................... 303/3; 60/545;
188/353; 188/358; 192/1.33; 303/50; 303/89;
303/100; 303/114
[58] Field of Search ................. 188/353, 355–360,
188/181 A, 11, 265; 303/89, 114, 119, 18, 19,
50–56, 110, 10–12, 3, 2, 93, 100; 192/3 H, 3 S,
13 A, 4 R; 60/545, 550, 548, 590, 591, 547.1;
91/41–45

[56] References Cited

U.S. PATENT DOCUMENTS

| 2,108,182 | 2/1938 | Searle | 303/89 |
| 2,186,332 | 1/1940 | Freeman | 192/13 A |
| 2,231,004 | 2/1941 | Freeman | 192/13 A |
| 2,272,320 | 2/1942 | Freeman | 188/353 X |
| 2,287,562 | 6/1942 | Pennington | 188/353 X |
| 2,313,430 | 3/1943 | Goepfrich | 192/3 H |
| 2,328,684 | 9/1943 | Schnell | 192/3 H |
| 2,701,035 | 2/1955 | Leichsenring | 188/353 |
| 2,703,637 | 3/1955 | Dodge | 192/3 H |
| 3,298,471 | 1/1967 | Evans | 188/353 |
| 3,425,221 | 2/1969 | Canfield | 303/89 X |
| 3,498,426 | 3/1970 | Nakano | 192/13 A |
| 3,617,663 | 11/1971 | Whittemore | 188/353 X |
| 4,579,202 | 4/1986 | McIntosh | 188/353 X |

FOREIGN PATENT DOCUMENTS

| 0083653 | 6/1980 | Japan | 188/353 |
| 0083654 | 6/1980 | Japan | 188/353 |

Primary Examiner—Douglas C. Butler
Attorney, Agent, or Firm—Toren, McGeady & Associates

[57] ABSTRACT

In a hydraulic brake system for a vehicle of the kind comprising a fluid pressure source having a reservoir and a hydraulic booster having a power piston arranged to receive the pressure fluid of a control fluid chamber which is proportional to a stepping down force on a brake pedal, a normally open type valve is disposed in a fluid passage provided for returning the pressure fluid of the control fluid chamber to the reservoir and is arranged to close in response to a braking pressure retaining signal produced when the vehicle is stopped by brake application.

6 Claims, 6 Drawing Sheets

HYDRAULIC BRAKE SYSTEM FOR VEHICLE

FIELD OF THE INVENTION AND RELATED ART STATEMENT

This invention relates to a brake system for a vehicle including a brake hydraulic booster and more particularly to a hydraulic booster arranged to have the brake fluid pressure retained until the vehicle is allowed to move again when the vehicle is brought to a stop by brake application.

Heretofore, hydraulic boosters of various kinds have been provided for boosting the braking force of the brake system of a vehicle. Meanwhile, separately from such a booster, there has been also provided a device called a braking hydraulic retainer which is arranged to retain the braking fluid pressure of a vehicle stopped by brake application until the vehicle is allowed to move again. The booster and the retainer are provided for completely different purpose. Besides, they have nothing in common in structural arrangement. They have been, therefore, discretely contrived. However, since both of them are to be applied to a common object, i.e. the same brake system for a vehicle, adequate arrangement to combine them into one unified body would contribute to improvement in assembly work on the vehicle, reduction in the number of parts and thereby to the structural and functional improvement of the vehicle.

SUMMARY AND OBJECT OF THE INVENTION

This invention is based on the above stated concept. It is therefore a principal object of this invention to arrange the hydraulic booster of a hydraulic brake system of a vehicle to be capable of performing a brake fluid pressure retaining function in addition to its boosting function.

It is another object of this invention to provide a hydraulic brake system which is capable of retaining brake fluid pressure on all wheels of a four-wheel vehicle by means of a single electro-magnetic valve.

These and further objects and features of this invention will become apparent from the following detailed description of preferred embodiments thereof taken in connection with the accompanying drawings.

BRIEF DESCRIPTION OF THE DRAWINGS

FIG. 1 shows this embodiment as in a state of a non-braking state;

FIG. 2 shows it as in a brake applying state; and

FIG. 3 shows it as in a state of retaining brake fluid pressure.

DETAILED DESCRIPTION OF THE PREFERRED EMBODIMENTS

Embodiment Example 1

Figure 1:
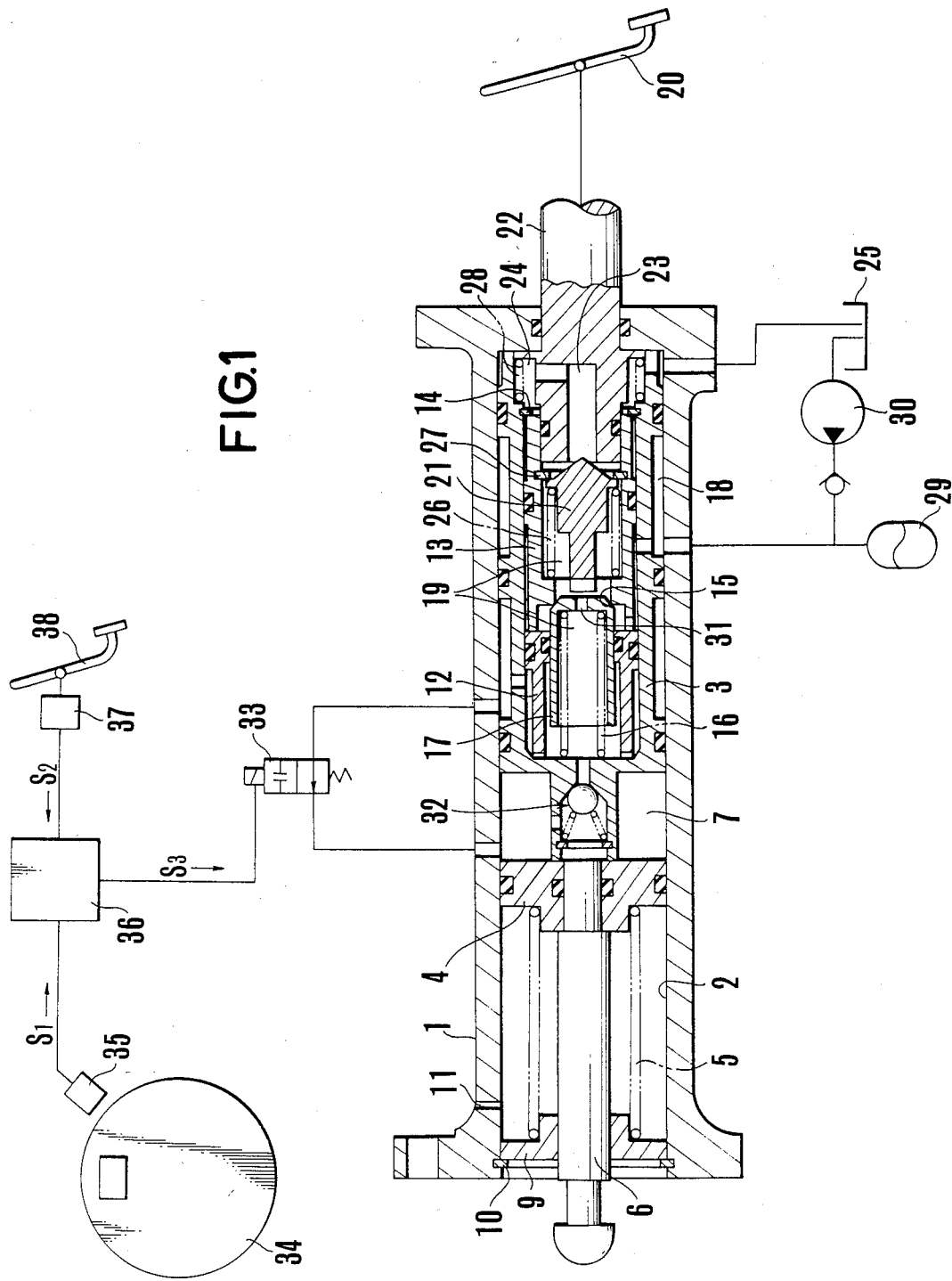
FIGS. 1, 2 and 3 show in outline the operation of a hydraulic booster arranged according to this invention.
Figure 2:
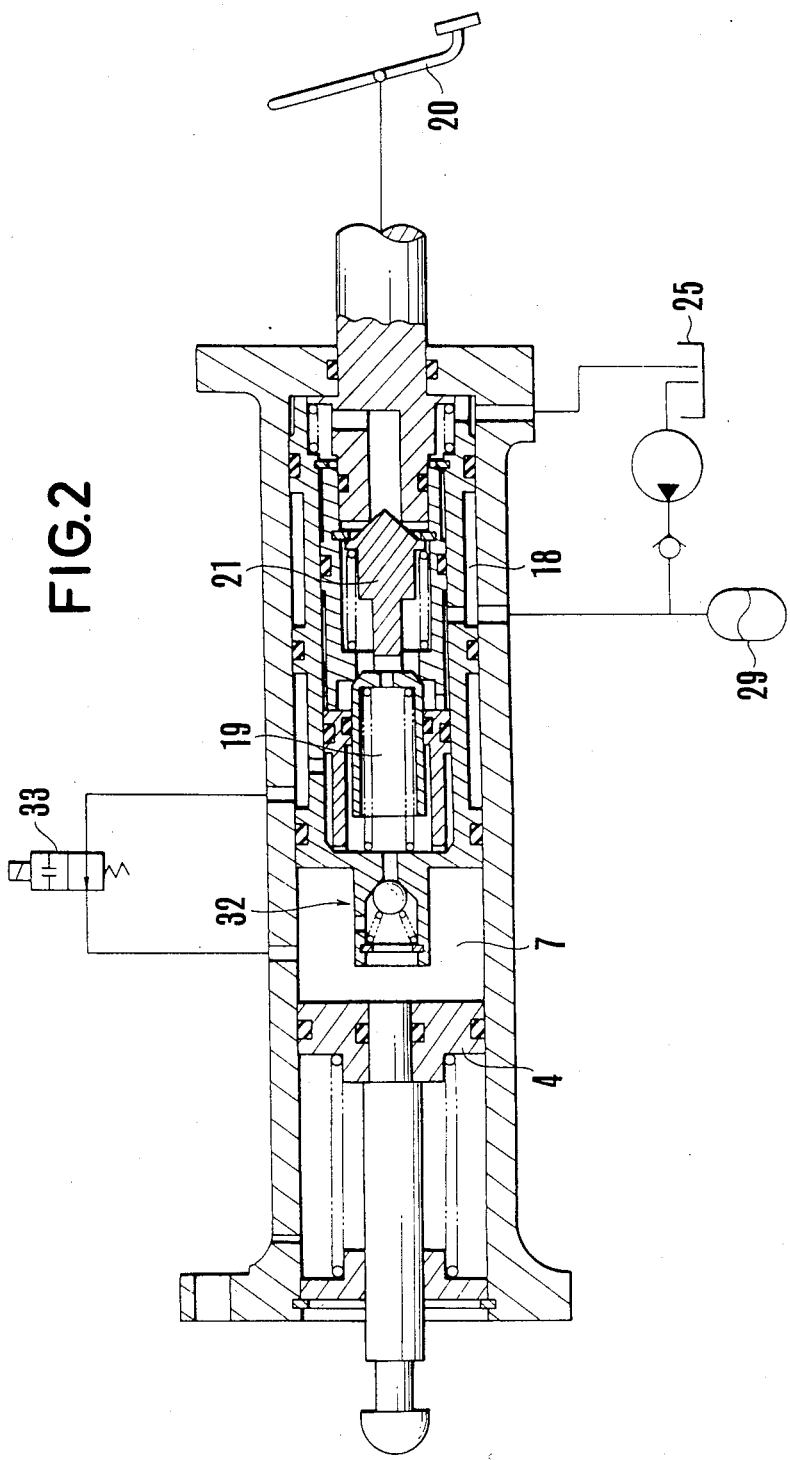
Figure 3:
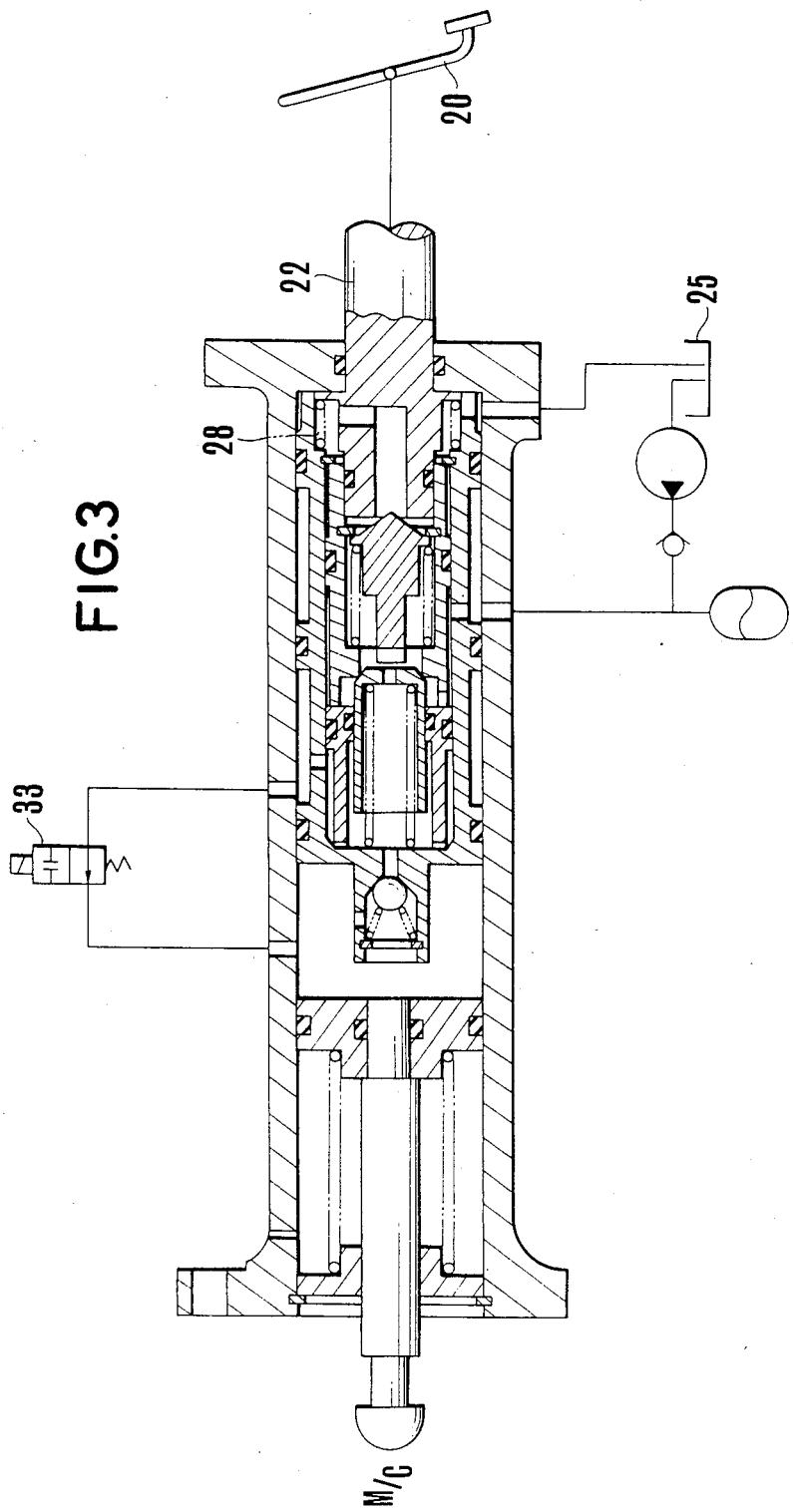

A first embodiment example is arranged as shown in FIGS. 1, 2 and 3, wherein FIG. 1 shows it as in a no-brake applying state; FIG. 2 shows it as in a brake applying state; and FIG. 3 shows it as in a brake fluid pressure retaining state.

Referring to these drawings, the illustration includes a cylinder body 1; a cylinder 2; a fixed inner cylinder member 3 which is disposed within the cylinder 2 and incorporates a pressure control valve device therein; a power piston 4 which engages one end of the inner cylinder member 3; and a plunger 6. The plunger 6 is arranged substantially in one unified body with the power piston 4. One end part of the plunger 6 protrudes outward from the cylinder body 1 and is connected by means of a return spring 5 to a brake fluid pressure generating device (normally a master cylinder) which is not shown. The parts 3 to 6 are contained within the cylinder 2. A control fluid chamber 7 is formed in between the cylinder member 3 and the power piston 4. A spring seat 9 is arranged to receive one end of the return spring 5. The illustration further includes a retaining ring 10 and an air vent 11 allowing a chamber containing the return spring 5 to communicate with the atmosphere. The power piston is coupled with the master cylinder in a manner well known and as disclosed in U.S. Pat. No. 3,298,177.

The pressure control valve device which is disposed within the inner cylinder member 3 is arranged in the following manner: The member 3 is in a tubular shape opening at one end thereof. Within this tubular shape, there are provided tubular bodies 12 and 13 which are axially arranged one after another and are fixed in position by fitting engagement with a retaining ring 14. A valve body 17 is liquid-tightly and slidably engaged with the inner circumference of the tubular body 12 and is arranged to abut on a valve seat 15 of the other tubular body 13 with the spring force of a spring 16 exerted thereon. Communication between an input fluid chamber 18 which is formed between the tubular bodies 12 and 13 and an output chamber 19 formed within the tubular bodies 12 and 13 is arranged to be allowed and blocked by engagement and disengagement of the valve body 17 and the valve seat 15. A normally closed valve is thus formed by this arrangement. An input transmission arrangement is formed by a rod 22 which is arranged to move in response to a stepping down action on the brake pedal 20 and to move the valve body 17 of the normally closed valve away from the valve seat 15 via a floating valve body 21.

In the arrangement described, the rod 22 forms in conjunction with the above stated floating valve body 21 a normally open type return valve which closes at the initial stage of the movement of the rod 22. When this return valve is open, the pressure fluid of the output fluid chamber 19 is allowed to escape to a reservoir 25 via a passage 23 and a return fluid chamber 24. A hold spring 26 and a retaining ring 27 are arranged to have the floating valve body 21 open the return valve under a no-brake applying condition as shown in FIG. 1. When the brake pedal 20 is stepped down, the rod 22 moves to close the return valve. This causes fluid pressure to act on the fore end of the rod 22. This results in a reaction to the brake pedal. The rod 22 is provided with a return spring 28.

The above stated input fluid chamber 18 is connected to an accumulator 29. Therefore, when the valve body 17 is caused to move away from the valve seat 15 by the stepping down action on the brake pedal, the pressure fluid from the accumulator 29 is transmitted via the input fluid chamber 18 to the output fluid chamber 19. Then, the fluid pressure within the output fluid chamber 19 comes to act on the end part of the rod 22 as mentioned above to bring about a reaction to the stepping down action on the brake pedal. Therefore, when the fluid pressure transferred to the inside of the output fluid chamber 19 increases, the rod 22 is brought back to its initial position. Then, this causes the valve body 17 to abut on the valve seat 15. The fluid pressure transmitted to the inside of the output fluid chamber 19 thus becomes a value proportional to the stepping down force on the brake pedal 20. The fluid within the reservoir 25 is taken up into the accumulator 29 by the pump 30.

The output fluid chamber 19 extends throughout the whole insides of the tubular bodies 12 and 13 via a fluid passage 31 formed in the valve body 17. A check valve 32 which is disposed at one end of the inner cylinder member 3 is arranged to allow the pressure fluid to flow from the output fluid chamber 19 to the control fluid chamber 7. Further, the output fluid chamber 19 is connected via a normally open type electro-magnetic change-over valve 33 to the control fluid chamber 7.

The velocity of the wheel 34 is detected by a sensor 35. A velocity signal S1 from the sensor 35 is supplied to a detection circuit 36. Another sensor 37 is arranged to detect the start action of the vehicle and to produce a signal S2, which is then supplied to the detection circuit 36. In the case of a vehicle provided with an automatic transmission device, the sensor 37 detects a stepping down action on an accelerator pedal. The detection circuit 36 is arranged to close the electro-magnetic change-over valve 33 when the vehicle is stopped and to open the valve 33 when the vehicle is started. The operation of the embodiment is as follows: Under a no-braking condition, the movable members 4, 17, 21 and 22 are respectively kept in their initial positions by means of spring forces as shown in FIG. 1. The control valve which consists of the valve body 17 and the valve seat 15 is closed; the return valve in between the floating valve body 21 and the rod 22 is open; and the change-over valve 33 is open. Therefore, the fluid pressure from the accumulator 29 is not transmitted to the output fluid chamber 19. Meanwhile, the fluid pressure condition of the control fluid chamber 7 is in communication with the reservoir 25 via a pressure fluid return path consisting of the change-over valve 33, the output fluid chamber 19, the fluid passage 23 and the return fluid chamber 24. Therefore, fluid pressure within the control fluid chamber 7 is zero.

In the event of brake application, the return valve is closed and the control valve is opened by a stepping down action on the brake pedal 20 as shown in FIG. 2. As a result, fluid pressure proportional to the stepping down force on the brake pedal 20 is transmitted from the accumulator 29 to the output fluid chamber 19 as mentioned in the foregoing. This fluid pressure is further transmitted via the check valve 32 to the control fluid chamber 7. This moves the power piston 4. According to this, brake fluid pressure is generated at the master cylinder which is not shown. In this instance, the return valve is closed and the change-over valve 33 remains open.

When the vehicle is brought to a stop by brake application, the stopping of the vehicle is detected by the detection circuit 36. Then, according to the output of the detection circuit 36, a brake fluid pressure retaining (or holding) signal S3 is supplied to the change-over valve 33 to close the valve 33 (see FIG. 3). Under that condition, even if the brake pedal 20 is released from the stepping down action, the pressure fluid within the control fluid chamber 7 is not allowed to come back to the reservoir. Therefore, the power piston 4 is restrained from returning, so that the brake fluid pressure is continuously kept in its generated state. Meanwhile, the rod 22 is returned to its initial position by the force of the return spring 28. With the exception of the change-over valve 33, therefore, all other movable members come back to their initial positions. Then, the pressure fluid within the output fluid chamber 19 is released toward the reservoir.

Next, when a start action of the vehicle is detected by the detection circuit 36, the brake fluid pressure retaining signal S3 comes to a stop to bring the change-over valve 33 back to its normal open state. The fluid pressure within the control fluid chamber 7 is released to the reservoir via the above stated return path. The brake fluid pressure is thus released. Further, the detection circuit which produces and stops producing the brake fluid pressure retaining signal can be arranged in a known manner.

With the embodiment arranged in the manner as described, the additional provision of the electro-magnetic change-over valve gives the advantageous effect of a brake fluid pressure retaining function. It is especially advantageous that the brake fluid pressure retaining process is performed in such a manner that the master cylinder is kept in its operative state, so that the same effect is obtainable for all of the four wheels from the use of a single change-over valve. This permits simplification in structure and reduction in the number of parts of the system.

The check valve which is included in this embodiment is arranged to allow only the flow of the pressure fluid from the output fluid chamber 19 to the control fluid chamber for the purpose of ensuring a speedy flow of the pressure fluid during brake application. Therefore, the check valve may be replaced with any other device that is capable of attaining that purpose, such as a one-way seal arrangement using a piston cup, an arrangement having a check valve on the outside of the cylinder body or the like.

Embodiment Example 2

Figure 4:
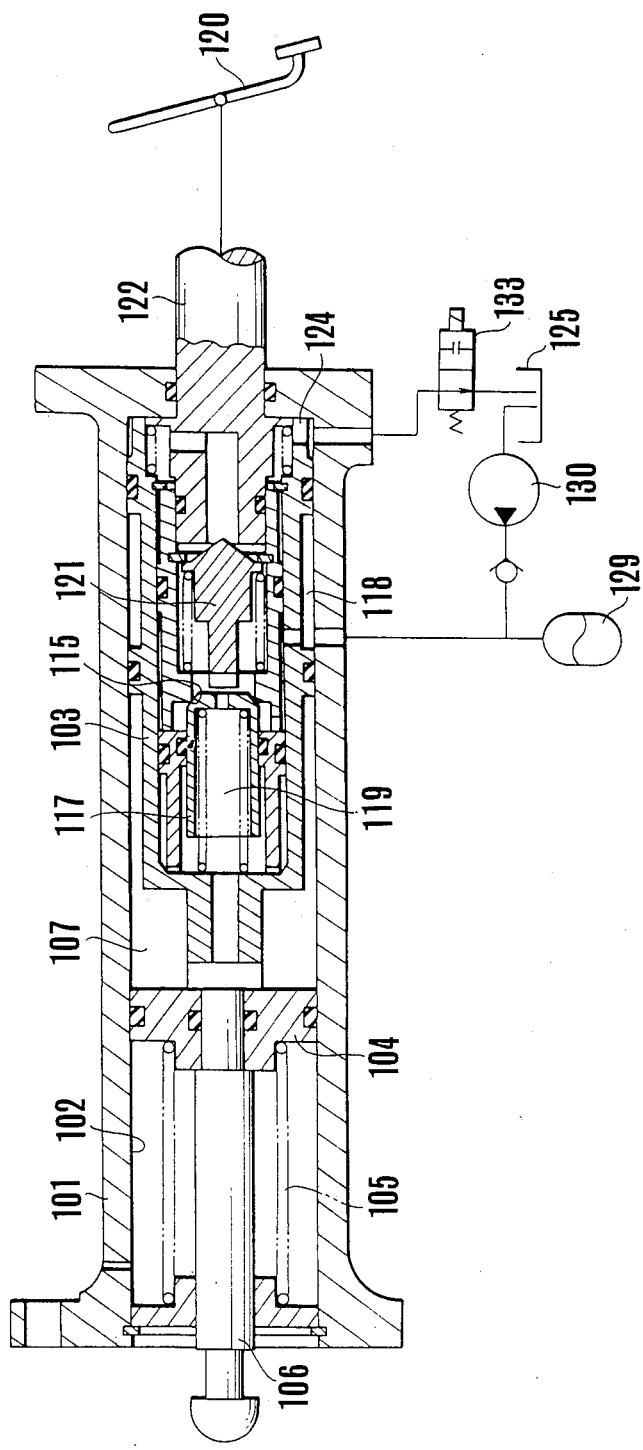
FIGS. 4 and 5 show another hydraulic booster as a second embodiment example of this invention, FIG. 4 showing it as in a non-braking state and FIG. 5 showing it as in a state of retaining brake fluid pressure.
Figure 5:
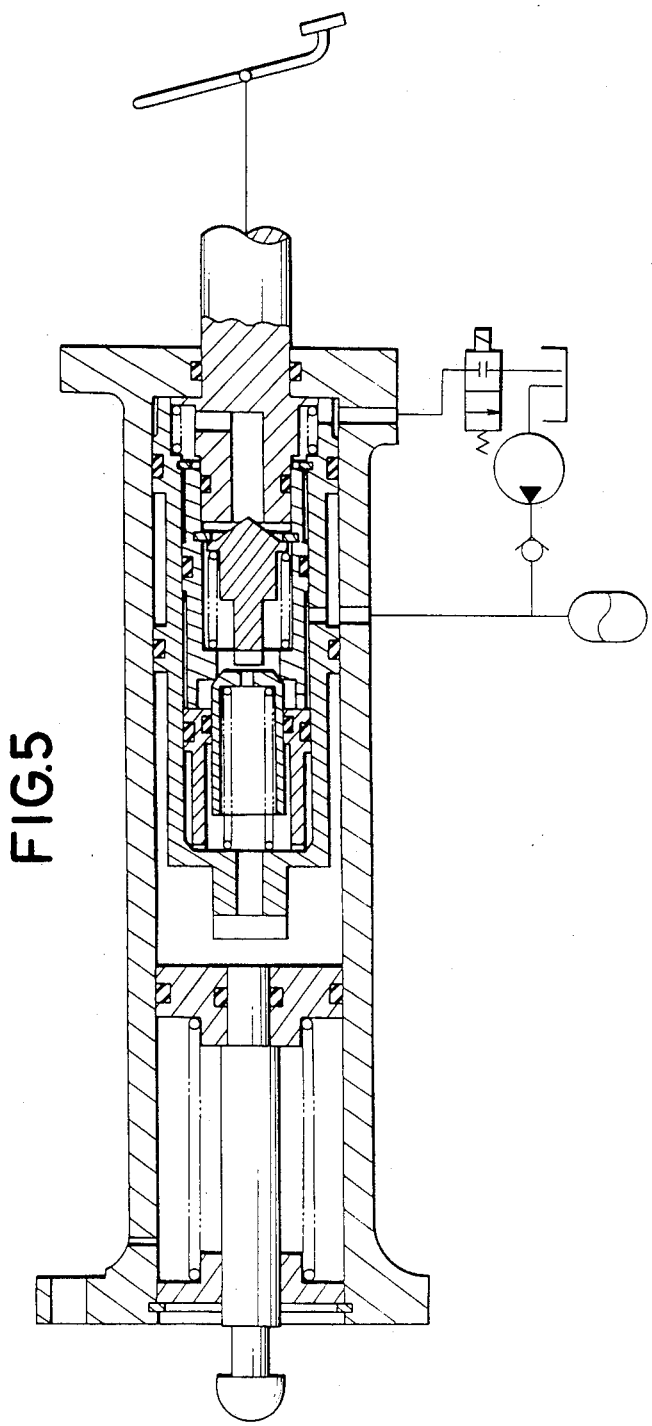

A second embodiment example of this invention is arranged as shown in FIGS. 4 and 5. The second example is arranged in the same manner as the first example with the exception of that the above stated check valve 32 is omitted and that the normally open type electro-magnetic change-over valve 33 is interposed in between the return fluid chamber 24 and the reservoir 25 instead of between the control fluid chamber 7 and the output fluid chamber 19. Therefore, in FIGS. 4 and 5, the members which are similar to those used in Example 1 are indicated by adding 100 to the reference numerals used in the preceding drawings and are omitted from the following description:

The operation of Example 2 under a no-brake applying condition is as shown in FIG. 4 and the operation under a brake applying and brake fluid pressure retaining condition is as shown in FIG. 5. These operations are about the same as in Example 1. With the arrangement of the check valve omitted, the structural arrangement of Example 2 is simpler than Example 1.

Embodiment Example 3

The arrangement of a third embodiment example of this invention differs in the following points from Example 1: The component members which are similar to those of Example 1 are indicated by adding 200 to each of the reference numerals used in the description of Example 1. A feature of Example 3 lies in that the inner cylinder member 212 is arranged to be movable and to function as a power piston. A fluid chamber which serves to move the inner cylinder member 212 is connected to an output fluid chamber 219 through an electro-magnetic change-over valve 233 which is arranged to normally open to the output fluid chamber 219. This fluid chamber is formed by a control fluid chamber 207 and one end part of the inner cylinder member which is confronting the control fluid chamber 207. The returning flow of the pressure fluid from the control fluid chamber 207 is blocked by a shift of the position of the change-over valve 233 from an open state to a closed state. By this, the inner cylinder member 212 is restrained from coming back to its initial position. A one-way valve 234 which is arranged to allow a flow of the pressure fluid from the output fluid chamber 219 to the control fluid chamber 207 is connected in a bypassing manner to the electro-magnetic change-over valve 233.

Figure 6:
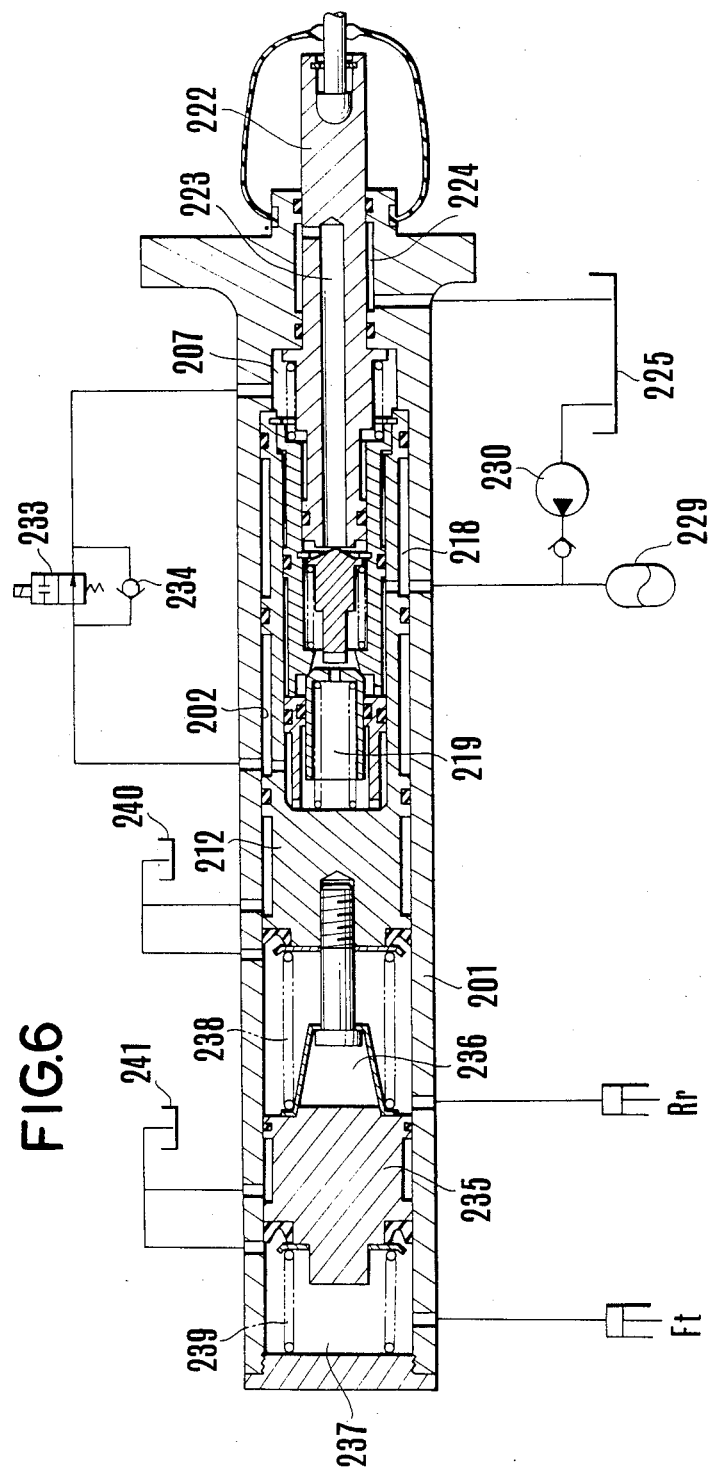
FIG. 6 shows in outline a hydraulic booster arranged according to this invention as a third embodiment example.

In the case of the hydraulic booster of Example 3, a tandem type arrangement of a master cylinder generally employed is disposed on the fore end side of the inner cylinder member 212. The hydraulic booster and the master cylinder are arranged in one unified body. The illustration of FIG. 6 includes a balance piston 235; a fluid chamber 236 which is formed between the balance piston 235 and the inner cylinder member 212 and is arranged to serve for rear wheel brakes Rr; a brake fluid chamber 237 which is formed between the balance piston 235 and the fore end wall of the cylinder and is arranged for front wheel brakes Fr; return springs 238 and 239; and reservoirs 240 and 241.

In accordance with the arrangement of Example 3, the brake fluid pressure is arranged to be retained when the vehicle comes to a stop with the pressure fluid within the control fluid chamber 207 kept there by the closing action of the electro-magnetic change-over valve 233. By this, Example 3 gives the same advantageous effect as Example 1.

In accordance with this invention, the hydraulic booster is arranged to be capable of performing the brake fluid pressure retaining function as well as its boosting function, so that various components of the brake system can be arranged in a compact size and that the brake fluid pressure can be retained for all of the four wheels of the vehicle by means of a single electro-magnetic valve to permit reduction in the number of required parts. Therefore, the invention has a great utility.

What is claimed is:

1. A hydraulic brake system for a vehicle, comprising a fluid pressure source including a reservoir, a cylinder body forming an inner cylinder, a power piston located within said inner cylinder, an inner cylinder member arranged within the inner cylinder and arranged to oppose the power piston, a control chamber located within the inner cylinder between the power piston and the inner cylinder member, a control valve mechanism provided within said inner cylinder member and operative in association with a brake pedal to control the communication between the fluid pressure source and the control chamber, a normally open-type valve provided in a path communicating between the control chamber and the reservoir, and a detection circuit for detecting stoppage of the vehicle and closing the normally open-type valve according to the detection signal when the brake is applied.

2. A hydraulic brake system according to claim 1, including a one-way valve arranged within said inner cylinder and parallel to the normally open-type valve, said one-way valve permits only the flow of the pressure fluid from the fluid pressure source to the control chamber.

3. A hydraulic brake system according to claim 2, wherein the one-way valve is contained in the inner cylinder member.

4. A hydraulic brake system according to claim 1, wherein the normally open-type valve is located between the control chamber and the control valve mechanism.

5. A hydraulic brake system according to claim 1, wherein the normally open-type valve is located between the control valve mechanism and the reservoir.

6. A hydraulic brake system for a vehicle comprising a fluid pressure source having a reservoir, a cylinder body forming an inner cylinder, an inner cylinder member slidably mounted within said inner cylinder, a valve mechanism provided in the inner cylinder member and operable in association with a brake pedal, a brake input fluid chamber provided at one end of the inner cylinder member and communicating to a brake device, a control chamber formed at the other end of the inner cylinder member, a normally open-type valve provided in a path connecting between the valve mechanism and the control member, and a detection circuit which detects stoppage of the vehicle and closes the normally open-type valve according to the detection signal.

* * * * *